US006638382B2

(12) United States Patent
Satou

(10) Patent No.: US 6,638,382 B2
(45) Date of Patent: Oct. 28, 2003

(54) METHOD AND APPARATUS FOR FEEDING SHEETS TO BE APPLIED TO A WIRING HARNESS, SHEET CUTTING APPARATUS AND TAPE ADHERING APPARATUS

(75) Inventor: Takayoshi Satou, Kanazawa (JP)

(73) Assignee: Sumitomo Wiring Systems, Ltd. (JP)

( * ) Notice: Subject to any disclaimer, the term of this patent is extended or adjusted under 35 U.S.C. 154(b) by 155 days.

(21) Appl. No.: 09/726,068

(22) Filed: Nov. 29, 2000

(65) Prior Publication Data

US 2001/0002612 A1 Jun. 7, 2001

(30) Foreign Application Priority Data

Dec. 1, 1999 (JP) .......................................... 11-341975

(51) Int. Cl.[7] ................................................ B32B 31/18

(52) U.S. Cl. ......................... 156/64; 156/247; 156/256; 156/269

(58) Field of Search .......................... 156/64, 247, 256, 156/269, 352, 361; 226/9; 83/76.1

(56) References Cited

U.S. PATENT DOCUMENTS 3,942,934 A * 3/1976 Momiyama et al. ........ 425/547
4,407,063 A * 10/1983 Johnson ..................... 29/623.2
5,401,110 A * 3/1995 Neeley ....................... 400/621
5,857,393 A * 1/1999 Kohiyama ................... 83/167
6,039,102 A * 3/2000 Sadrakula et al. .......... 156/510

FOREIGN PATENT DOCUMENTS

| | | |
|---|---|---|
| JP | 7-235228 | 9/1995 |
| JP | 9-151007 | 6/1997 |

* cited by examiner

*Primary Examiner*—Richard Crispino
*Assistant Examiner*—Cheryl N. Hawkins
(74) *Attorney, Agent, or Firm*—Gerald E. Hespos; Anthony J. Casella

(57) ABSTRACT

A sheet piece (S') that is needed to assemble wiring harnesses (W) on a harness assembling board (A) is recognized, and a recognition signal is generated. A sheet cutting apparatus (20) then cuts a sheet (S) from a sheet roll to a specified length in accordance with the recognition signal. The cut sheet piece (S') then is dropped onto the respective harness assembling board (A). The sheet cutting apparatus (20) has a sheet feed roller (22), pressure rollers (23) that are movable toward and away from the feed roller (22) and cutters (26) for cutting the sheet (S). The feed roller (22) is rotated and the pressure rollers (23) press the sheet (S) against the feed rollers (22) in response to the recognition signal. Thus, a specified length of the sheet (S) is fed, and the cutters (26) cut the sheet (S) into a sheet piece (S') of the specified length. Therefore, in a production line, a desired number of sheet pieces (S') can be supplied to the specified harness assembling boards (A) by cutting the sheet (S) from the sheet roll when necessary.

7 Claims, 5 Drawing Sheets

METHOD AND APPARATUS FOR FEEDING SHEETS TO BE APPLIED TO A WIRING HARNESS, SHEET CUTTING APPARATUS AND TAPE ADHERING APPARATUS

BACKGROUND OF THE INVENTION

1. Field of the Invention

The present invention relates to a method and apparatus for feeding a sheet that is to be applied to a wiring harness, and particularly to be wound around a wiring harness. The invention also relates to a sheet cutting apparatus and an adhesive double-coated tape adhering apparatus.

2. Description of the Related Art

A wiring harness "W" for an electrical wiring system of an automotive vehicle or a copier is shown in FIG. 5. The wiring harness W includes a plurality of wires "a" that are bound and branched. The wiring harness W also includes connectors c that are connected at ends of the respective wires "a". Sheet pieces S' of specified sizes are wound manually around the outer surfaces of bundles of the wires "a" in necessary positions to protect the wires "a". The sheet pieces S' are made, for example, of a polyvinyl chloride (PVC) or any other suitable material that may be selected in view of electrical insulation or watertight properties. An adhesive layer is formed adjacent a side edge of each sheet piece S', as shown in FIG. 6, to prevent the sheet pieces S' from being peeled off the wiring harness and to facilitate winding the sheet piece S' onto the wiring harness. The adhesive layer is formed by employing a double-coated adhesive tape t that has a separable strip e covering one adhesive surface of the tape t. In particular, one adhesive surface of the tape t is adhered adjacent an edge of the sheet piece S', and the separable strip e covers the adhesive surface of the tape t that is not adhered to the sheet piece S'. The separable strip e is peeled off, as indicated by the arrow in FIG. 6, when the sheet piece S' is about to be applied to the wiring harness W.

Conveying harness-assembling boards along a conveyor generally produces wiring harnesses W of this type. Operators at various stations along the conveyance line then successively mount various parts on the respective harness assembling boards. Parts mounted along this conveyance line include the sheet pieces S', which conventionally have been stored in containers on the harness assembling boards or in containers at mount positions of the respective parts, as disclosed, for example, in Japanese Unexamined Patent Publication No. 7-235228.

A technique for adhering an adhesive double-coated tape t to a sheet S is disclosed in Japanese Unexamined Patent Publication No. 9-151007. This technique employs a rolled sheet S that is dispensed, and that is rolled again after the adhesive double-coated tape t is adhered thereto.

The technique for storing the sheet pieces S' in the containers requires an inefficient procedure of preparing the specified sheet pieces S' off the production line. Further, this prior art technique requires the number of containers to at least equal the number of harness assembling boards. Additionally, the containing operation is cumbersome because the parts for the different harness assembling boards must be stored in containers at the specified positions, and the containers must be capable of distinguishing the sheet pieces S' in the respective containers.

Further, a smaller amount of the sheet S is wound on one reel in the roll of the sheet S to which the adhesive double coated tape t is adhered because the sheet S becomes thicker at one side by an amount equal to the thickness of the tape t, and the sheet S is difficult to wind and dispense from the roll due to a difference in the thickness at the opposite sides.

Accordingly, it is an object of the present invention to improve operational efficiency in a production line.

SUMMARY OF THE INVENTION

The subject invention eliminates the preparation of sheet pieces by feeding a necessary number of sheet pieces to a specified position of a desired harness assembling board on a production line when the sheet pieces are necessary. Moreover, the invention eliminates the operation of peeling off a separable strip, thereby improving an operation efficiency by adhering an adhesive double coated tape to a sheet being dispensed from a sheet roll and separating the separable strip of the adhesive double coated tape before the sheet is cut to a specified length.

The invention is directed to a method for feeding sheets to be applied to a wiring harness. The method comprises a step of recognizing required sizes of sheets that are necessary to assemble the wiring harness. A recognition signal then may be generated. The method then comprises cutting one or more sheets dispensed from corresponding sheet rolls to specified lengths or sizes to form sheet pieces in accordance with the recognition signal. The method further comprises dropping the sheet pieces in positions corresponding to the respective harness assembling board. The dropping of the sheet pieces may be coordinated with the conveyance of the harness assembling boards along a conveyance system.

Preferably, the sheet pieces are dropped directly onto the respective harness assembling board. Accordingly, it is possible to recognize the sheet pieces that are necessary to assemble a wiring harness on each harness assembling board, to cut one or more sheets dispensed from corresponding sheet rolls to specified lengths and to supply the cut sheet pieces to each harness assembling board by dropping the cut sheet pieces at a specified position on each harness assembling board.

With such an arrangement, a desired number of sheet pieces of desired lengths can be supplied to the respective harness assembling boards in a production line. Thus, unlike the prior art, it is not necessary to prepare the sheet pieces beforehand, thereby improving operability and reducing the stock of the sheet pieces. The required length of the sheet pieces may be changed if the kinds of wiring harnesses to be assembled are changed. Such a change can be accommodated easily by adjusting a dispensed amount of the sheet.

According to this method, a plurality of sheet rolls of different widths may be prepared, and the sheets of the desired widths are dispensed from the respective rolls and cut to specified lengths in accordance with the recognition signal. Thus, sheet pieces having a plurality of different widths can be supplied, thereby increasing modes of wiring harnesses to be assembled. The number of the sheet rollers may correspond to the number of the different sheet widths necessary for one production line.

Each sheet may have an adhesive double coated tape provided with a separable strip adhered adjacent one side edge. The separable strip may be peeled off before the sheet is cut to the specified length. The presence of the separable strip does not hinder the travel of the sheet and, if the separable strip is peeled and the sheet pieces are dropped onto the harness assembling board, an operator need not peel the strip off.

Most preferably, the adhesive double coated tape is adhered to each sheet by adhering an end of the double coated tape that is dispensed from a tape roll to the sheet that is dispensed from the sheet roll. The remainder of the double coated tape is adhered to the sheet as the tape is dispensed from the tape roll by a dispensing force created as the sheet is dispensed.

At this stage, the separable strip is pulled apart from the sheet and peeled as the sheet is fed in accordance with the recognition signal. Thus, the sheet can be cut smoothly without the separable strip getting caught in a sheet cutting apparatus.

A specific construction of the sheet cutting apparatus comprises a feed roller that may be driven by an external force for feeding at least one sheet dispensed from at least one sheet roll. The apparatus also comprises a pressure roller that is movable toward and away from the feed roller with the sheet located between the feed roller and the pressure roller. The apparatus further comprises a cutter for cutting the sheet into sheet pieces. The pressure roller is pressed against the feed roller that is rotated to feed the sheet by a specified length, and the fed sheet is cut by the cutter in accordance with the recognition signal.

The feed roller of the above-described sheet cutting apparatus is rotated by an amount corresponding to the length of the sheet to be fed. At this time, the pressure roller is pressed against the feed roller with the sheet located between the pressure roller and the feed roller. Thus, the sheet of a specified length is fed and cut. The sheet cannot be fed unless the pressure roller is pressed against the feed roller. Therefore, the sheet of a specified length can be fed by constantly rotating the feed roller and pressing the pressure roller against the feed roller for a time corresponding to an amount by which the sheet is to be fed. The feed roller may not be rotated constantly, but may be rotated while the pressure roller is pressed against feed roller. In other words, the feed roller may be rotated during a period including a contact period with the pressure roller in accordance with the recognition signal. The sheet of a specified length can also be fed by constantly pressing the pressure roller against the feed roller and rotating the feed roller by an amount by which the sheet is to be fed. In such a case, the pressure roller is left spaced apart when the sheet is located between the two rollers.

A specific construction of a tape adhering apparatus comprises one or more sheet reels for supporting corresponding sheet rolls, and one or more tape reels for supporting corresponding rolls of adhesive double coated tapes. The sheets are dispensed from the sheet rolls by an external force, and the adhesive double coated tapes are dispensed from the tape reels while back tensions are applied to the tape. The dispensed ends of the tapes then are adhered to the corresponding sheets.

The tape adhering apparatus described above enables the adhesive double coated tape to be dispensed from the reel in a tense state as the sheet is dispensed. One adhesive surface of the tape then is adhered to the sheet.

A specific construction of an apparatus for feeding sheets comprises a detector at a specified position for detecting when a harness assembling board is at that position. The sheet cutting apparatus preferably is provided above the harness assembling board at the specified position. At least one sheet from the tape adhering apparatus is introduced to the sheet cutting apparatus. The separable strip of the adhesive double coated tape that been adhered to the sheet then is peeled from the sheet by turning the separable strip around a bar located before rollers of the sheet cutting apparatus. The peeled separable strip then is pulled by rollers that are rotated in synchronism with the feed roller of the sheet cutting apparatus.

The above-described sheet feeding apparatus has the advantages of the sheet cutting apparatus and the tape adhering apparatus, as described above. Further, since the separable strip is peeled in synchronism with the feed of the sheet, the sheet can be cut smoothly without the separable strip getting caught in the sheet cutting apparatus. Thus necessary sheet pieces can be fed smoothly onto the harness assembling boards.

These and other objects, features and advantages of the present invention will become apparent upon reading of the following detailed description of preferred embodiments and accompanying drawings.

DETAILED DESCRIPTION OF THE PREFERRED EMBODIMENT

Figure 1:
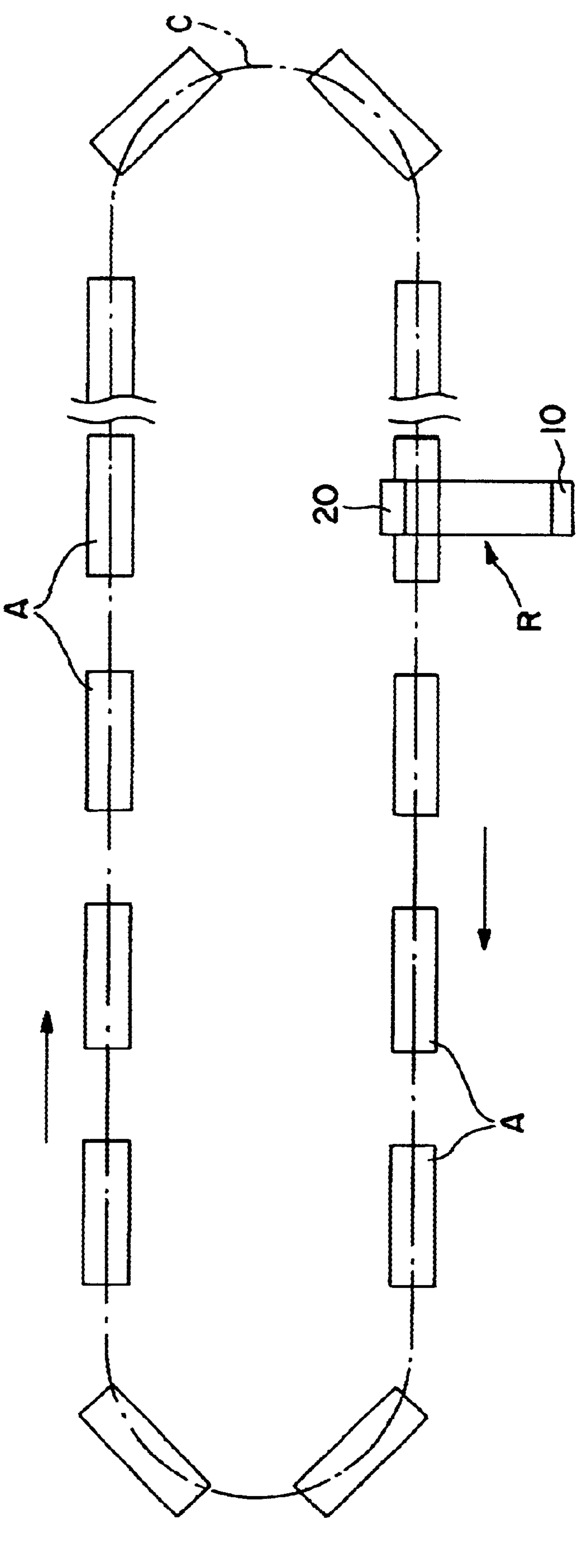
FIG. 1 is a schematic plan view of a production line according to one preferred embodiment of the invention.

FIG. 1 shows a wiring harness assembly line where harness-assembling boards A are conveyed on carriages B along a conveyor C in the direction of the arrows shown in FIG. 1. Operators are positioned at specified locations along the conveyance path to assemble wiring harnesses W by successively mounting the respective parts on the harness assembling boards A. A single sheet feeding apparatus R is illustrated in FIG. 1 at a suitable position along the production line. However, several such apparatuses R may be provided. More particularly, an apparatus R may be provided before or near each position of operation where sheet pieces S' need to be wound.

Figure 2:
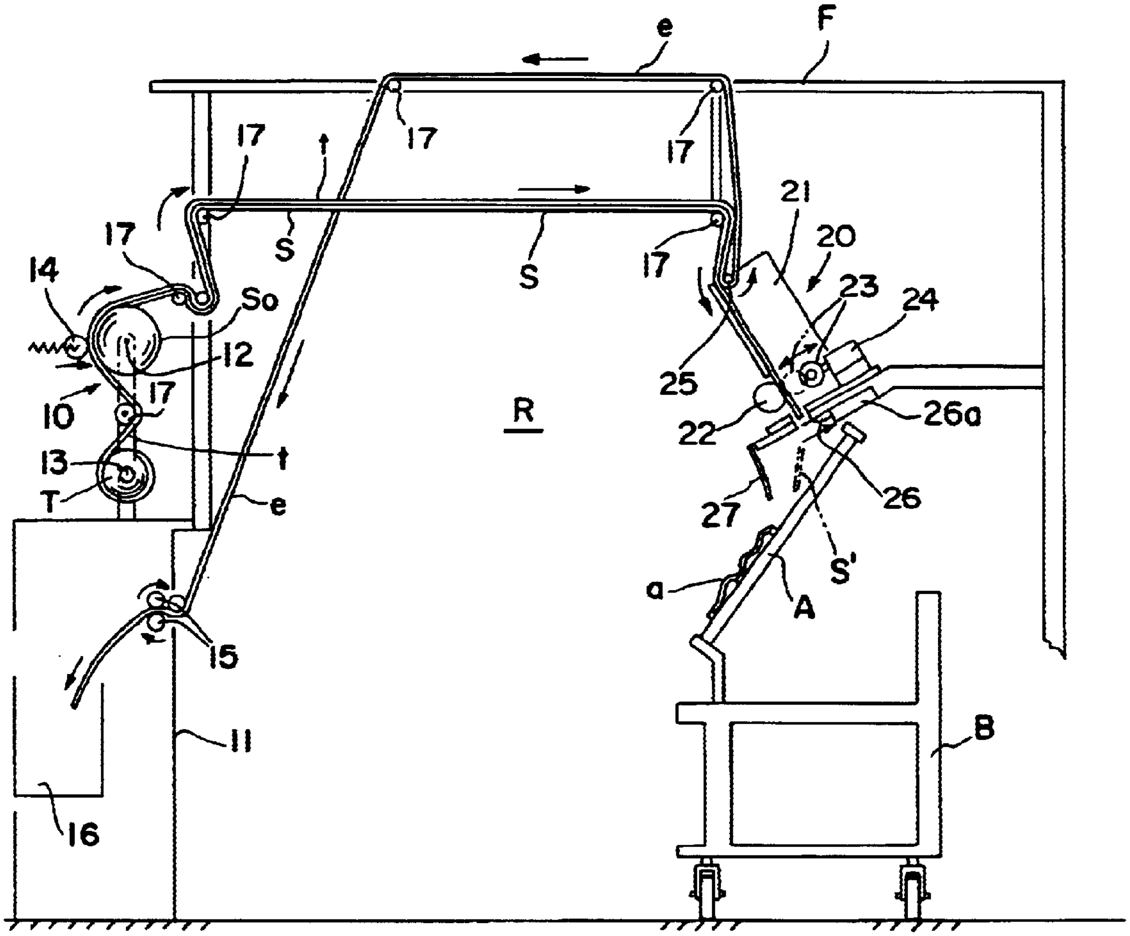
FIG. 2 is a schematic side view of the embodiment.
Figure 3:
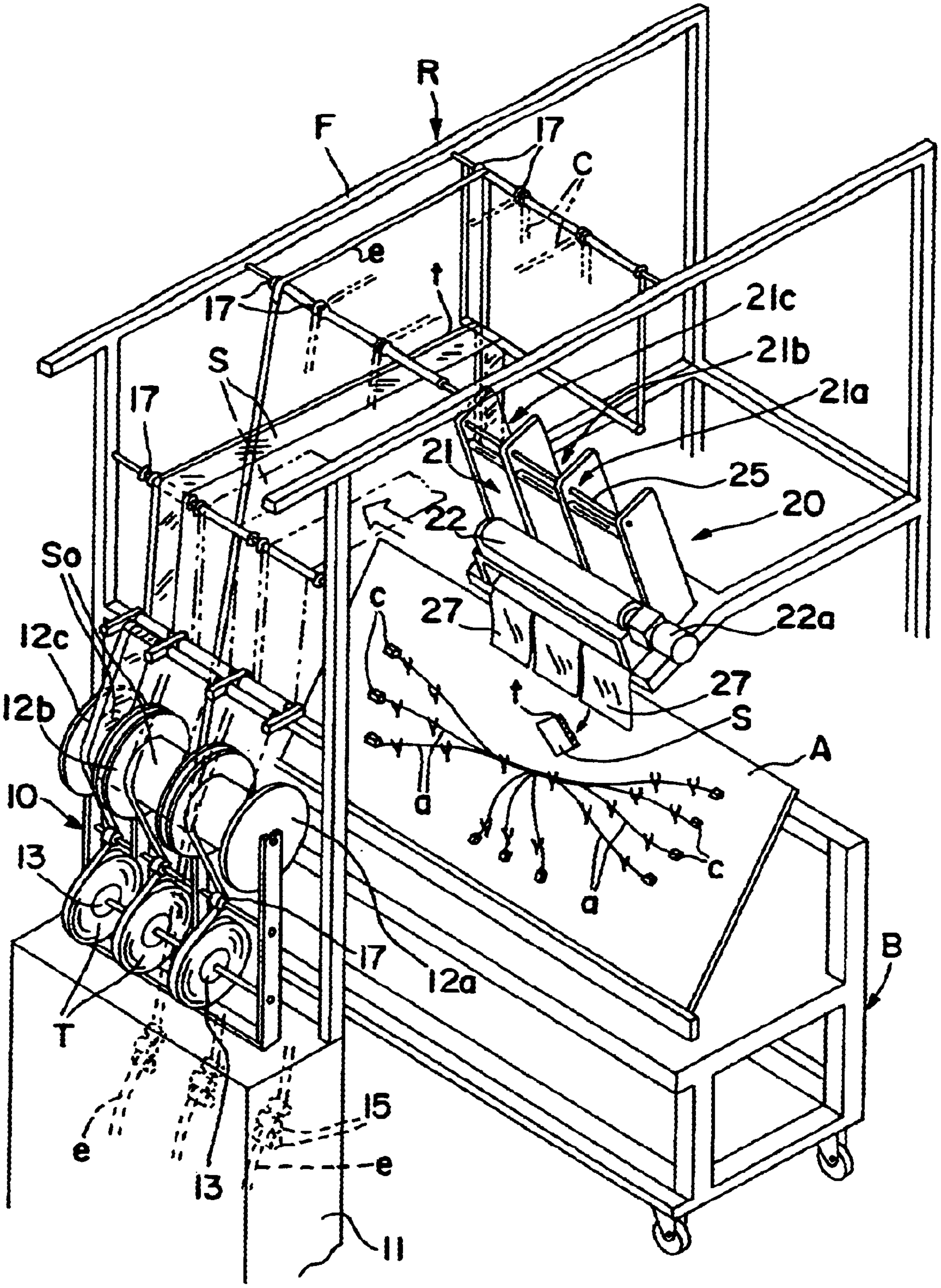
FIG. 3 is a schematic perspective view of the embodiment.

As shown in FIGS. 2 and 3, the sheet feeding apparatus R has a tape adhering apparatus 10 at the first or front side of a frame F and has a sheet cutting apparatus 20 at the second or rear side of the frame F. The tape adhering apparatus 10 has three reels 12*a*, 12*b*, 12*c* (collectively, "12") provided on a box 11. Sheets S are wound on the respective reels 12. The sheets S may be made of PVC or any other suitable material and may have different widths. The respective reels 12 preferably are provided on reels 13 for adhesive double-coated tapes "t". Back tensions are applicable to the reels 13. Thus, if a roll T of the adhesive double-coated tape "t" is mounted on the reel 13 and the tape "t" is pulled, the pulled tape "t" is tense.

Figure 4:
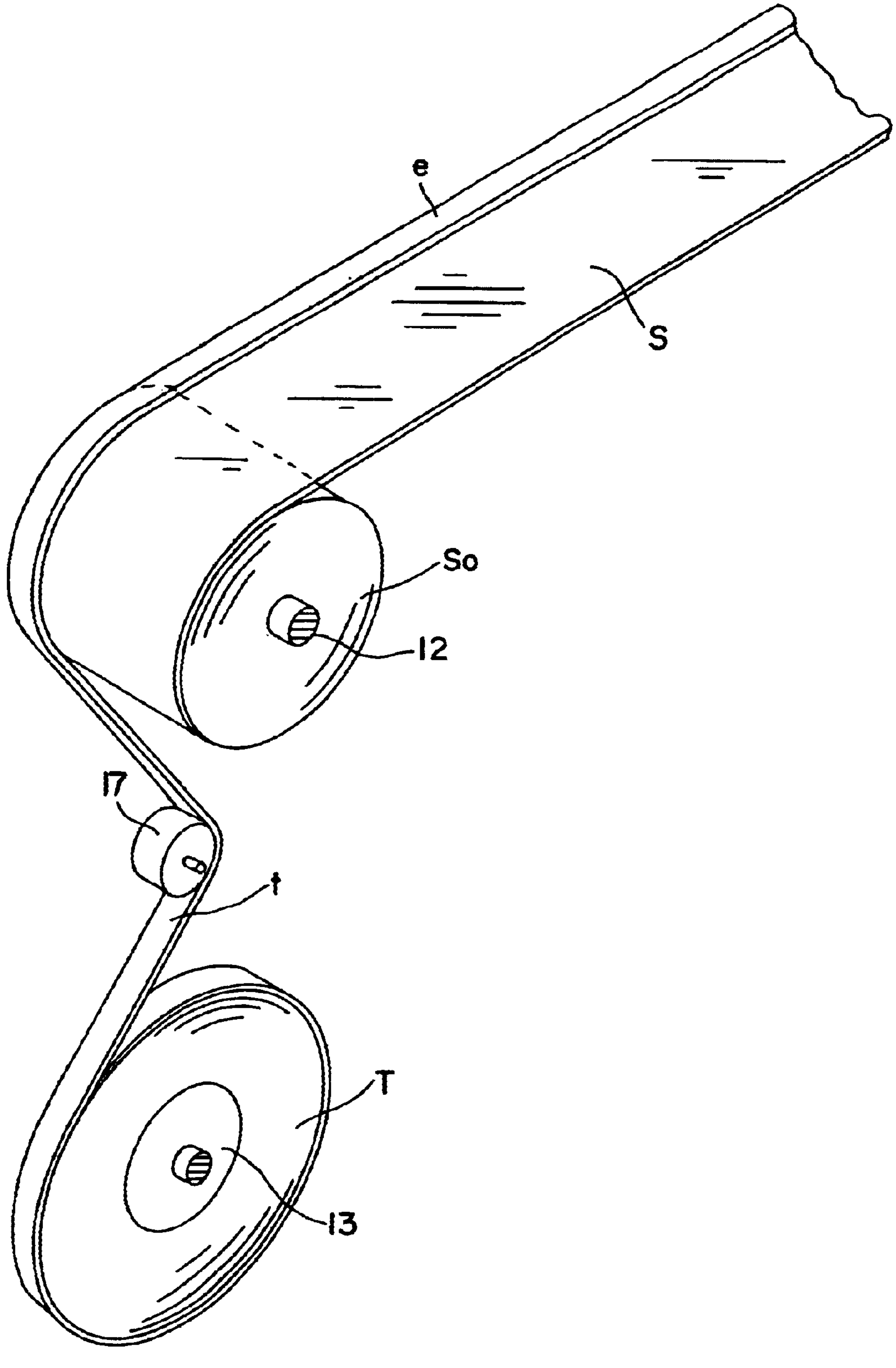
FIG. 4 is a perspective view showing an essential portion of the embodiment.
Figure 5:
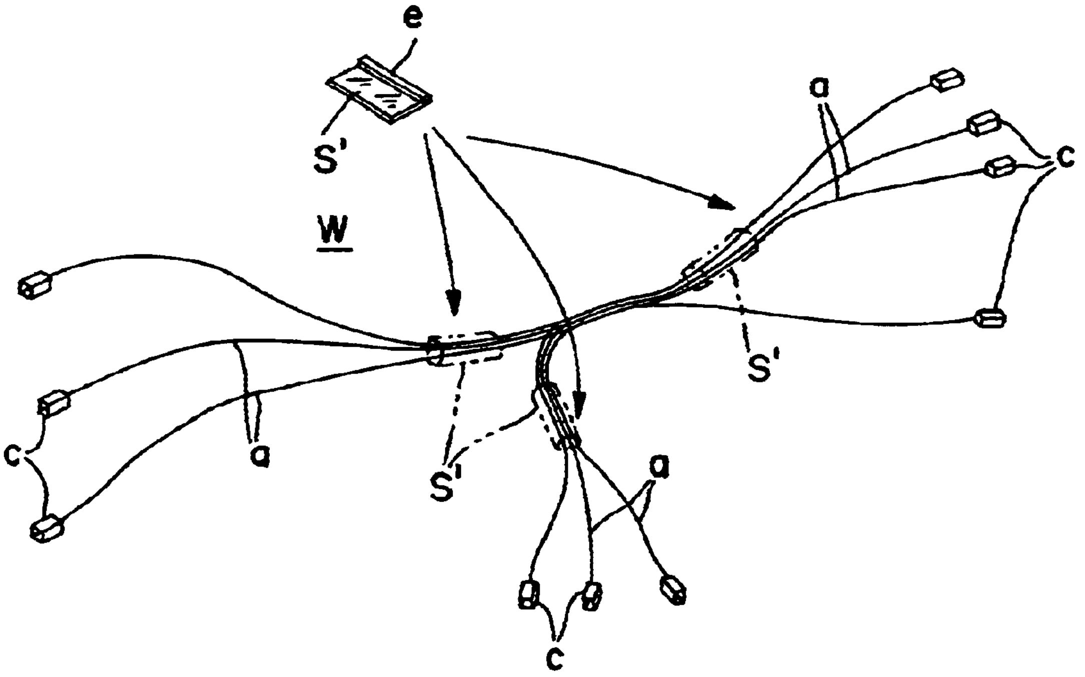
FIG. 5 PRIOR ART
FIG. 5 is a schematic view of a wiring harness.
Figure 6:
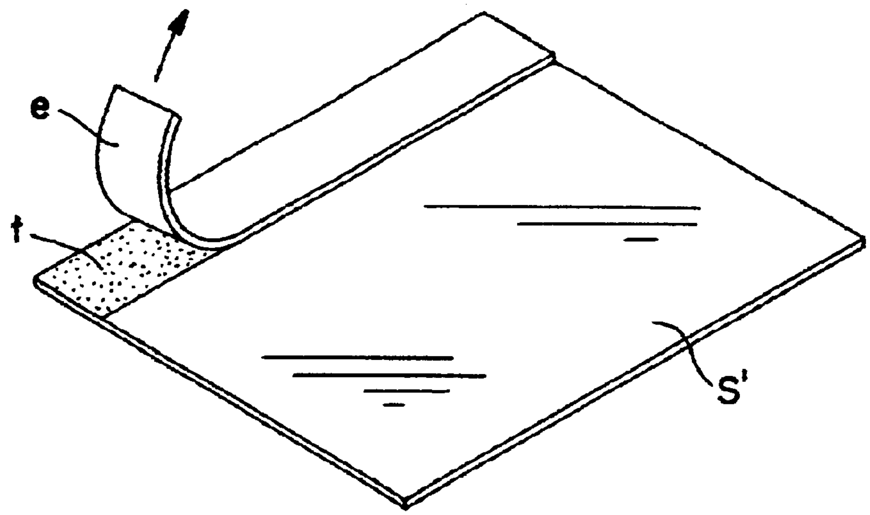
FIG. 6 PRIOR ART
FIG. 6 is a perspective view of a sheet (piece) to be wound.

The roll T of the adhesive double-coated tape "t" has a tape-shaped separable strip "e" located between adjacent layers of the tape "t". The tape "t" may be pulled from the roll T to expose an adhesive layer on one entire surface of the tape "t". The other surface of the tape "t" is covered by the separable strip "e". The pulled tape "t" is introduced and adhered to one side of the sheet S of a sheet roll $S_0$ with the exposed adhesive layer faced down, as shown in FIG. 4. Accordingly, when the sheet S is pulled from the sheet roll $S_0$, the tape "t" also preferably is pulled in a tense state to be adhered to the one side end of the sheet S and is dispensed together with the sheet S as shown in FIG. 4. The tape "t" can be adhered more securely if a pressure roller 14 is provided for the tape "t", as shown in FIG. 2. Alternatively, the feeding path of the tape "t" can be bent as shown in FIG. 4 to increase a contact area with the outer surface of the sheet roll $S_0$.

Two feed rollers 15 are provided in the box 11, and the peeled separable strip "e" can be fed between the rollers 15. A driving device (not shown) rotates the roller 15 and pulls the separable strip "e" into a container 16.

The sheet cutting apparatus 20 has a guide box or structure 21 that is fixed to the frame F and that preferably is divided into three sections 21*a*, 21*b* and 21*c*. A feed roller 22 is provided at a front bottom portion of the box 21 and is rotated by a motor 22*a*. Pressure rollers 22 are provided behind the feed rollers 23 for the respective sections 21*a*, 21*b* and 21*c* of the box 21. The pressure rollers 23 are movable toward and away from the feed roller 22 by air cylinders 24. The widths of the respective pressure rollers 23 are smaller than those of the respective sheets S to ensure that the pressure rollers 23 do not touch the adhesive layers of the sheets S. A sheet detection sensor (not shown) is provided in each section of the box 21 for detecting whether or not the sheet S has been fed.

A peeling bar 25 is provided at the top of the box 21. The sheets S dispensed from the sheet rolls $S_0$ are introduced between the bar 25 and the front wall of the box 21 via guide rollers 17 mounted on the frame F. The sheets S are fed between the feed roller 22 and the pressure rollers 23, whereas the separable strip "e" is turned at the bar 25. The separable strip "e" is introduced between the rollers 15 in the box 11 via other guide rollers mounted on the frame F.

Cutters 26 are provided on the bottom surfaces of the respective sections 21*a*, 21*b* and 21*c* of the box 21 to cut the sheets S fed by the rollers 22, 23, so that the cut pieces S' drop onto the harness assembling board A. Each cutter 26 cuts the sheet S by the cooperation of a movable blade moved by a cylinder 26*a* and a fixed blade. Sheet-shaped stoppers 27 are provided before the cutters 26 to prevent the sheet pieces S' from jumping out.

A detector (not shown) is provided in the sheet feeding apparatus R and detects an index such as a bar code on the harness assembling board A or on the carriage B as they are conveyed slowly on the line. The type and number of the sheet pieces S' to be fed to the specified position of the harness assembling board A are confirmed and a recognition signal is inputted to a controller.

The controller, in return, sends a signal corresponding to a feed amount of the sheet S in accordance with the recognition signal to the motor 22*a* and the driving device for the roller 15. Simultaneously, the cylinder 24 is driven to press the pressure roller 23 against the feed roller 22 with the sheet S located between rollers 22 and 23. Thus, the sheet S can be fed between the rollers 22 and 23. The motor 22*a* then is stopped and the cylinder 24 is driven to move the pressure roller 23 backward away from the feed roller 22 after a specified amount of the sheet S is fed. In this way, the feed of the sheet S is stopped. Subsequently, the cutter 26 can be actuated to cut the sheet S. As a result, a sheet piece S' of a specified length drops onto the harness assembling board A in a specified position as shown in FIG. 3.

The above operation is performed for each sheet S in accordance with the recognition signal, and sheet pieces S' of specified widths and lengths are fed to a specified position on one harness assembling board A. The separable strips "e" are peeled off and are pulled into the container 16 by the rollers 15 as the sheets S are fed.

By suitably repeating the above operation, desired sheet pieces S' are fed to the specified positions the respective harness assembling boards A.

It should be noted that the numbers of the sections of the box 21, of the pressure rollers 23, of the cutters 26, of the reels 12, 13, etc. can be changed as necessary according to the number of the types of the sheets S having different widths and the like.

The sheet pieces S' to which the adhesive double coated tapes "t" are adhered are used in the foregoing embodiment. However, the sheets S may be dispensed from the sheet rolls $S_0$ without adhering the tapes "t" in the case that the adhesive double coated tapes "t" are not necessary. Further, the roll $S_0$ of the sheet S to which the tape "t" is adhered beforehand may be mounted on the sheet reel. Alternatively or additionally, a suitable dispenser may provide adhesive portions, strips or glue on the sheets S.

As described above, the desired sheet pieces can be supplied onto the respective harness assembling boards in the production line according to the present invention. Therefore, it is not necessary to prepare the sheet pieces beforehand as in the prior art, thereby improving operation. Further, by peeling the separable strip off before the sheet is cut to a specified length, a peeling operation can be eliminated. As a result, a sheet winding operation can be performed with an improved efficiency.

What is claimed is:

1. A method for feeding at least one sheet to be applied to a wiring harness, comprising the steps of:

providing a conveyor with a plurality of harness-assembling boards for assembling wiring harnesses, each said harness assembly board being associated with an index for identifying size data for at least one said sheet required for the wiring harness to be assembled on the harness-assembling board;

conveying the harness assembly boards along the conveyer to each of a plurality of positions;

providing at least one sheet feeding apparatus fixed at at least one fixed position along the conveyor;

recognizing the index associated with the harness-assembling board aligned with the sheet feeding apparatus for identifying the size of at least one sheet necessary to assemble the wiring harness, and generating a recognition signal;

dispensing at least one sheet of a specified size from a corresponding sheet roll in accordance with the recognition signal, and simultaneously applying an adhesive double coated tape provided with a separable strip to a side edge portion of the sheet;

peeling off the separable strip from the double coated tape;

cutting the sheet dispensed from the corresponding sheet roll to the specified size to form a sheet piece in accordance with the recognition signal; and dropping the sheet piece gravitationally to a location on the harness assembly board in proximity to the respective wiring harness.

2. A method according to claim 1, wherein the steps are performed while sheet pieces necessary to assemble the wiring harnesses are supplied to harness assembling boards being conveyed.

3. A method according to claim 1, wherein the adhesive double coated tape is adhered to each sheet by adhering a dispensed end thereof from a tape roll to the sheet dispensed from the sheet roll and adhering the rest of the tape to the sheet while being dispensed from the tape roll by a dispensing force created as the sheet is dispensed.

4. A method according to claim 1, wherein the step of providing a fixed sheet feeding apparatus comprises providing a fixed sheet feeding apparatus having a plurality of sheet rolls of different widths and wherein the step of dispensing a sheet of a specified size from a corresponding sheet roll in accordance with the recognition signal comprises dispensing a sheet from a sheet roll of a selected width in accordance with the recognition signal and of specified length in accordance with the recognition signal.

5. A method according to claim 1, wherein the step of dropping the sheet piece in proximity to the respective wiring harness comprises coordinating the dropping of the sheet piece with the conveying of the harness assembly board so that the sheet piece is dropped onto the respective harness assembly board at a location on the board in proximity to the wiring harness being assembled on the board.

6. A method according to claim 1, wherein the step of providing a sheet feeding apparatus further comprises providing at least one stopper on the apparatus, and wherein the step of dispensing a sheet of a specified size from a corresponding sheet roll comprises dispensing the sheet into the stopper and deflecting the sheet gravitationally downwardly and toward the harness assembling board.

7. A method for assembling a wiring harness, comprising the steps of:

providing a conveyor with a plurality of harness-assembling boards for assembling wiring harnesses, each said harness assembly board being associated with an index for identifying size data for at least one said sheet required for the wiring harness to be assembled on the harness-assembling board;

conveying the harness assembly boards along the conveyer to each of a plurality of positions;

assembling a plurality of wires and connectors on the harness-assembling boards at each of a plurality of said positions;

providing at least one sheet feeding apparatus fixed at at least one fixed position along the conveyor;

recognizing the index associated with the harness-assembling board aligned with the sheet feeding apparatus for identifying the size of at least one sheet necessary to assemble the wiring harness, and generating a recognition signal;

dispensing at least one sheet of a specified size from a corresponding sheet roll in accordance with the recognition signal, and simultaneously applying an adhesive double coated tape provided with a separable strip to a side edge portion of the sheet;

peeling off the separable strip from the double coated tape;

cutting the sheet dispensed from the corresponding sheet roll to the specified size to form a sheet piece in accordance with the recognition signal;

dropping the sheet piece gravitationally to a location on the harness assembly board in proximity to the respective wiring harness; and wrapping the sheet piece around a plurality of a wires at a selected location on the wiring harness.

* * * * *